United States Patent [19]

Pomerleau et al.

[11] 4,451,896

[45] May 29, 1984

[54] ELECTRONIC CHRONOMETER

[75] Inventors: Andre Pomerleau; Jean-Francoys Brousseau, both of Quebec, Canada

[73] Assignee: Universite Laval, Ste-Foy, Canada

[21] Appl. No.: 283,138

[22] Filed: Jul. 14, 1981

[30] Foreign Application Priority Data

Jul. 14, 1980 [CA] Canada .................................. 356151

[51] Int. Cl.³ .............................................. G06F 15/28

[52] U.S. Cl. .................................... 364/569; 364/411; 368/10; 377/5

[58] Field of Search ....................... 364/410, 411, 569; 377/5, 13, 20; 368/3, 9, 10, 89, 107, 113; 340/323 R

[56] References Cited

U.S. PATENT DOCUMENTS

| | | | |
|---|---|---|---|
| 3,508,034 | 4/1970 | Toyama et al. | 377/5 X |
| 3,781,529 | 12/1973 | Abramson et al. | 377/5 |
| 4,035,627 | 7/1977 | Dickinson et al. | 364/706 |
| 4,156,870 | 5/1979 | Desarzens | 377/5 X |
| 4,166,360 | 9/1979 | Yamaguchi | 377/5 X |
| 4,290,128 | 9/1981 | Estabrook | 368/9 X |

*Primary Examiner*—Joseph F. Ruggiero
*Attorney, Agent, or Firm*—Larson and Taylor

[57] ABSTRACT

A digital timing system for sports competitions in which a large number of participants progress independently and simultaneously on the same track between a starting line and a finish line. This system comprises a starting time memory, a finish time memory, and a register which permits the temporary storing of the times of a predetermined number of events happening nearly simultaneously. The time is furnished by means of an oscillator and decade counters of which the multiplexed output is applied to the register where the information is entered. This information is shortly thereafter transferred to the starting time memory or to the finish time memory, as the case may be. A subtractor unit subtracts the recorded starting time of a selected participant from the real time when it is desired to display the lapsing time of the participant. At the final, the final track time is displayed. A console with local display allows the operator to obtain all the registered information for every participant, and means is provided for emptying the register by transferring the starting times and the final times to their respective memories. Data processing means is provided for applying handicap or other averaging curves to the results, and suitable print-out means produce written records of the results right at the end of the competition.

17 Claims, 7 Drawing Figures

ELECTRONIC CHRONOMETER

BACKGROUND OF THE INVENTION

This invention relates to the timing of sporting competitions in which a large number of participants progress independently and simultaneously on the same track between a starting position and a final line. The invention concerns particularly a digital timing apparatus for the determination of the elapse of time of anyone of a large number of participants, and of the final time of each participant at the crossing of the finish line.

The timing of sporting events in which a large number of competitors progress either simultaneously or consecutively and independently, the compilation of the results and the editing of same constitute a complex chore necessitating the collaboration of a large number of persons. Even in the best of conditions, it is difficult to prevent errors and to complete the compilation of the results in a reasonable delay. Such is the case, for example, in cross-country skiing competitions, foot races and marathons where participants start at regular intervals one after the other or by groups of differing size, and where the duration of the race can be relatively long, for example, one hour or more.

To our knowledge, no convenient timing device has existed before the present invention for the purposes of timing and display of such competitions requiring the intervention of only one person. The return to popularity of individual competitions has created a need for such a timing means capable of furnishing exact and official results as the competition progresses and offering the possibility of compiling and editing these results at the end of the race.

SUMMARY OF THE INVENTION

The object of the present invention is therefore a method of timing and an apparatus permitting the simultaneous and independent timing of a large number of participants, even in the case where a small number of finishes or starts occur nearly simultaneously. The system produces electric signals which display the progress of each participants timed individually and his finish time by means of a display and/or a printout.

Another object of this invention is to permit the registration of the starting and finish time of each competitor in such a manner as to permit the eventual processing of the results by applying averaging curves and the verification of the results at any moment.

Another object of this invention is to develop such a system at an affordable price for permitting the spectators to follow the evolution of the race time of the competitors on the track by means of a display, for example, a giant screen giving all pertinent information, under the control of only one person who is able to observe the departure and arrival order.

The invention provides a timing apparatus for sporting events involving a large number of participants, for determining the time elapsed from the start of each participant, comprising: a source of clock signal; register means for temporarily registering time data supplied by said source of clock signal at every start and every finish; memory means to store the starting and finish times of each participant; address means for relating stored data in said memory means to the right participants; manual control means for the transfer of registered times from said register means to the memory means; and subtractor means for subtracting a first time from a second time, for example, subtracting each participant's starting time from his finish time to obtain his race time.

The present invention also involves a method of timing comprising the steps of registering every starting and finish time of a participant, during sporting events involving a large number of participants, by means of a multiple level register, for example, a register of the type last-in, first-out; storing every word of information registered in said registering means into the appropriate section of a two-section memory; addressing every registered word of information to credit same to the corresponding participant; subtracting the stored starting time of each participant from his finish time; and displaying the difference and an identification of said participant.

According to a preferred embodiment of this invention, the timing system comprises a control panel at the operator's reach, and this panel comprises a miniaturized display means and an auxiliary selector which permits the operator to display on the control panel data other than that appearing on the giant screen. He can also consult the information stored in the register or in either section of the principal memory, and a means at his disposition permits him to retreive from the register the data which is stored therein and record same in the starting and finish time registration memory.

According to a preferred embodiment of the invention, the register temporarily stores indiscriminately the finish and starting times occuring quasisimultaneously, and the data so stored temporarily in the register comprises an addressing sign for distinguishing the starting times and the finish times from one another.

According to a particular embodiment of this invention, the clock consists of an oscillator group and decade counters group producing clock signals at a frequency of 100 Hz, this group comprising a series of at least seven decade counters furnishing time in terms of hours, tens of minutes, units of minutes, tens of seconds, units of seconds, tenths of seconds, and hundredths of seconds. An isolating buffer connected to each decade counter and a multiplexing circuit linked to these isolating buffers are used to multiplex the information furnished by the decade counters thereby reducing the number of circuits required. An isolating buffer in circuit between the multiplexed outputs and the register isolates the latter except upon the occurence of a crossing of the start or finish lines. Other similar isolating buffers are provided for acting in an analagous manner in relation with the finish times and starting times registration memories.

With this chronometer, the decade counter system continuously supplies real time data to the system and this information is registered at the exact starting or finish moment and is placed in memory in a proper location, that is to say, in a location corresponding to each participant's sweater number. The operator has a control to direct the choice of memory or sections thereof according to whether the word concerns a starting or a finish time and this means has become necessary because in certain competitions the start line is approximately at the same location as the finish line and as a consequence the operator must note the distinction.

The register mentioned above, placed between the counter and the memories, registers not only the finish times but also the starting times and its structure permits the retrieval of this information on a certain number of the most recent occurrences, for example, the eight last occurrences. Thus, if several participants are very close one to one another at the finish line and if a competitor arrives when another has just left, the operator will have the possibility of retrieving these times and placing them in memory shortly thereafter.

The operator has only two manual operations to perform; he must first key in the shirt number of the participant responsible for the last registered line crossing, and then command the transfer of this data from the register into the memory. He does the same for every registered event in the register. If by inadvertence the starting line gate or the finish line signalling device has been released, the operator simply disregards the stored data in the register and nothing is compromised in the memory.

When a participant approaches the finish line, it is desired to display the lapse of time of this participant still on the track. For this purpose, as soon as the operator keys into the apparatus the sweater number of the participant, the subtraction unit performs a continuous subtraction of the starting time from the progressing clocking time. However at the precise moment of the participant's finish line crossing, the display stops exactly at the official time of the participant. This is possible because the system automatically switches inputs of the subtraction unit, going from the clock signal to the recorded finish time in the register.

In a particular embodiment of the invention, the use of a computer permits, at the end of the competition, the completion and editing of the complete and official results, which avoids all of the secretarial work usually associated with the timing of such competitions. In this manner, the results can be published in the minutes following the end of the race.

The timing apparatus described above requires the intervention of the operator at two levels only. He must first, before the beginning of the competition, key in the numbers and the names of the participants into the memory means. Thereafter, during the competition, it suffices for him to identify the sweater numbers of the persons at the start and at the finish for which the starting and finish times are determined by the opening of the starting gate and the crossing of the finish line.

BRIEF DESCRIPTION OF THE DRAWINGS

In the attached drawings, which illustrate a particular embodiment of this invention.

DESCRIPTION OF PREFERRED EMBODIMENTS

Figure 1:
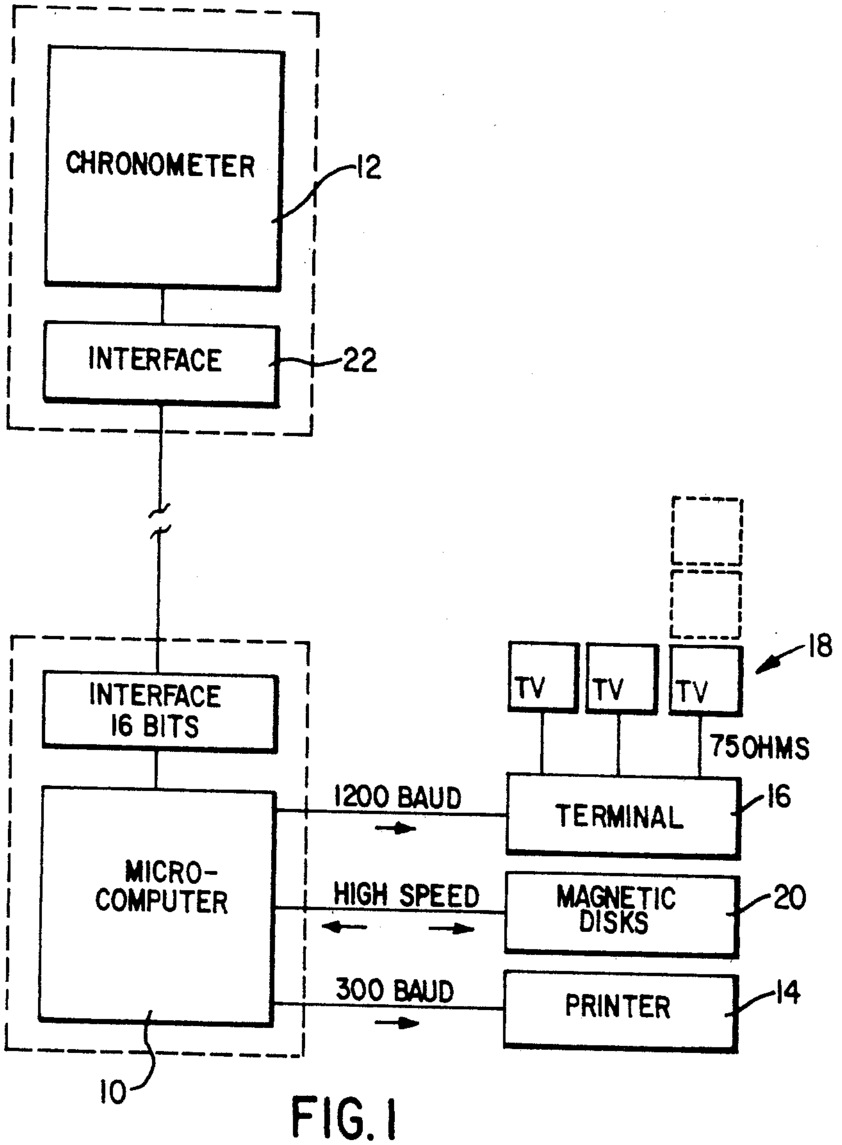
FIG. 1 is a block-diagram of a complete timing apparatus system.

FIG. 1 illustrates, by way of a timing system diagram, the processing of data, display and editing of sports competition results using a micro-computer 10 connected to the output of chronometer 12, and several accessories such as the printer 14, the terminals 16 which may comprise cathodic screens 18, and means for registering information in large quantity such as magnetic disks 20.

Interface 22 permits the transmission of data to the micro-computer 10. The process is as follows: on reception of the command signal, the chronometer 12 transmits a code for purposes of identifying whether it is a start or a finish. This code is followed by the competitor's number and then by the time of the event.

Following the input of this data, the computer 10 stores this information in memory on magentic discs 20. If it is a finish time, it immediately calculates the final time of the participant and displays it on terminal 16. It keeps up to date a list of the best times of the race which may be displayed on television screens 18 placed at different strategic points for purposes of public viewing.

At the end of the competition, computer 10 prints out the complete and official results by means of printer 14, and in so doing it eliminates all the secretarial work otherwise associated with such competitions and permits the publishing of the results in the minutes which follow the end of the race.

If all the possibilities of the complete system are used, the intervention of the operator is required only at two instances. He must first, before the competition, place into the micro-computer's memory a list of the numbers and the names of the participants. Thereafter, during the competition, it suffices for him to identify each participant by an address corresponding to his sweater number, at the start and at the finish line.

The complete system illustrated in FIG. 1, has been obtained by using, in a first case, a structure of parallel bits, parallel numbers, and a clock signal in seconds exclusively, and in a second case, a structure of parallel bits, series numbers with a clock signal in hours-minutes-seconds, which proves more difficult to obtain but permits a reduction in the number of integrated circuits required from 100 to 30.

This complete system has given excellent results when timing cross-country skiing competitions where more than 100 persons participated. The number of participants is no longer a limiting factor because if suffices to use memory elements having the necessary capacity.

Figure 2:
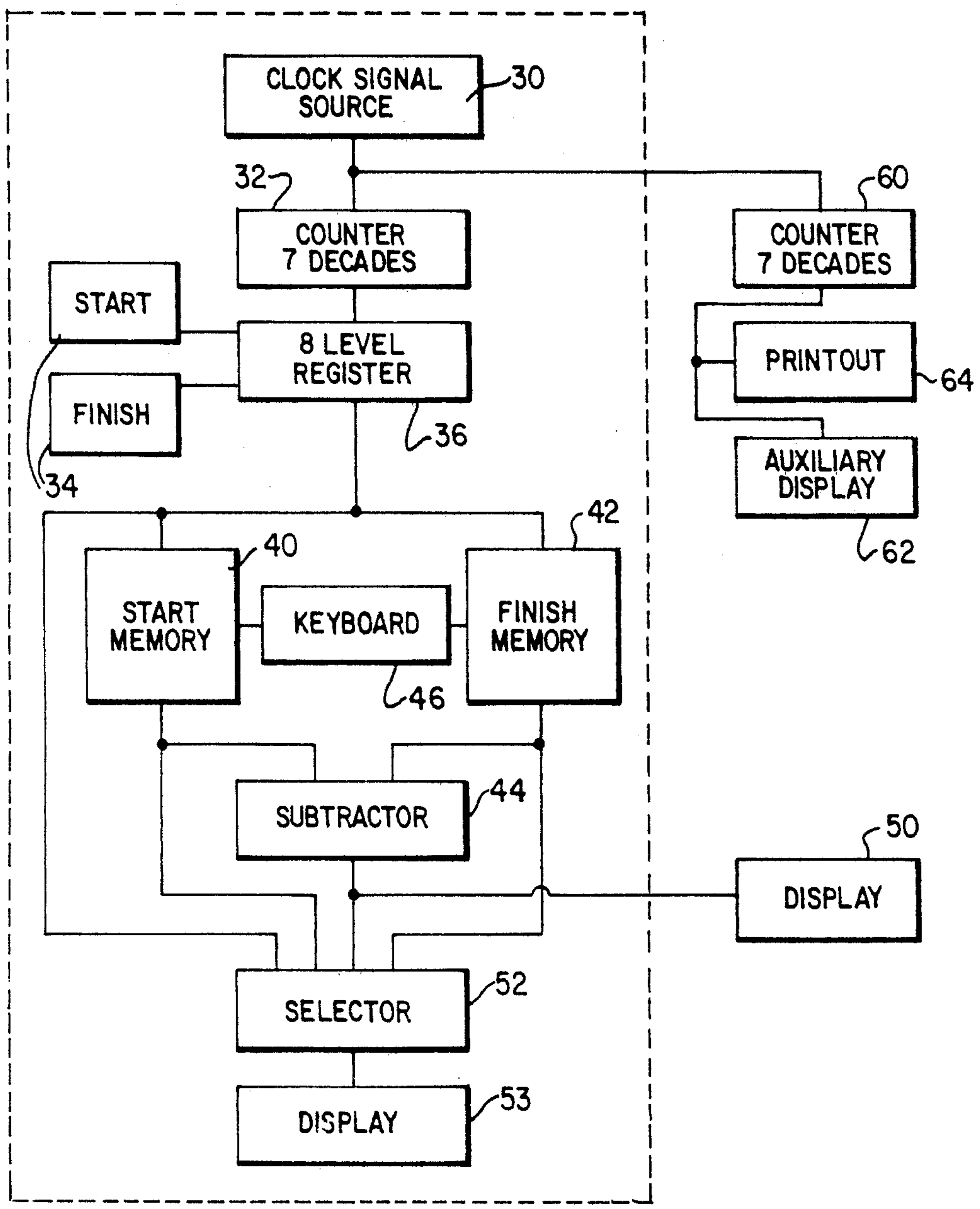
FIG. 2 is a block-diagram of a timing system.

FIG. 2 illustrates an autonomous timing apparatus, showing the basic system according to this invention omitting certain accessory elements of the system in FIG. 1.

A clock signal source 30 comprises a crystal oscillator of 10 kHz used for providing a stable time basis to the apparatus. A seven decade counter 32 furnishes the continuing time of the system in hours, minutes, seconds, tenths and one hundredths of a second. It suffices therefore to note the hour provided by the counter 32 at the exact moment of the start, or of the finish, and to store this number in memory at the correct location, pertaining to the corresponding participant.

Two parameters decide the location where this number will be stored. According to whether it is a start or a finish, the data will be placed in one memory or in the other. The operator controls the location of storage of the start and finish times by means of controls 34. It is useful to proceed in this manner because in certain competitions the start line and the finish line coincide, and it is therefore necessary for the operator to identify the nature of the event.

Figure 4:
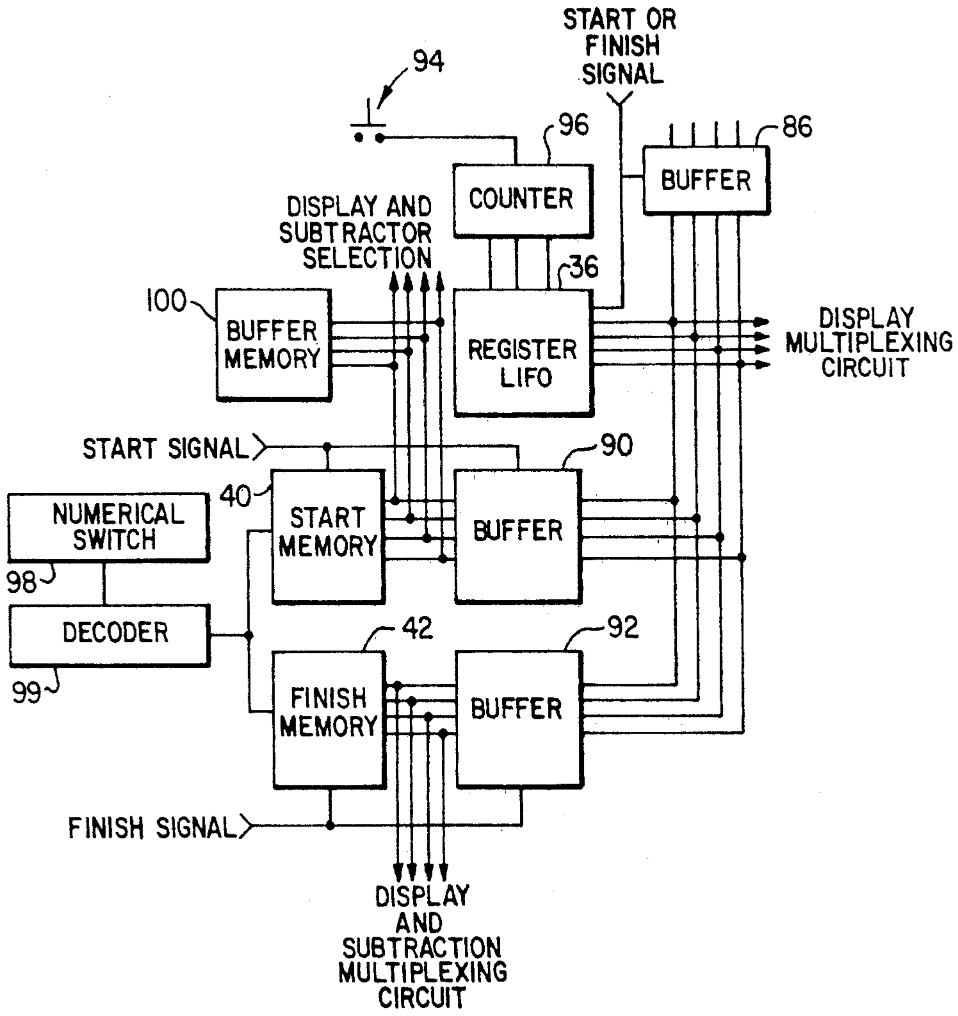
FIG. 4 is the diagram of the battery and the two memories of the apparatus of FIG. 2.

A multi-level operational register 36, for example, with eight levels, placed between the counter 32, and memories 40 and 42, is used to obtain the time of the occurrence. This structure permits the retrieval of the time of the eight most recent occurrences. In this manner if several competitors finish close one to the other, or if one competitor finishes when another has just left, the operator will have a possibility of retreaving the times and storing them in the memories 40, 42 as he wishes by means of the memory control 94 (FIG. 4).

There are therefore only two manual operations required: the number of the competitor must first be recorded in the apparatus after which the time must be stored in memory by an appropriate control.

If, by inadvertence, the starting gate or the arrival wire is actuated, it suffices for the operator to ignore it and nothing stored in the memories is compromised thereby.

The two memories 40, 42 output to the subtractor 44 the times to be subtracted. Therefore at any moment chosen by the operator, the elapsed time of the competitor whose number is identified by the keyboard 46, may be observed at the output of the subtraction unit 44. The apparatus may therefore be used to time as many competitors as there are addresses therefor in the memory.

Another interesting alternative is possible for the operator during the competition. If he wishes to observe the competitors time during the race, he may do so by means of a control (not illustrated) which replaces, at the input of the subtraction unit 44, the arrival time by the continuing clock time 30. The actual time of the competitor chosen may be displayed using the data provided by a continuous subtraction operation.

Display 50, permitting the public to follow the race time, is linked to the output of the subtractor 44. In this manner, the public may observe the display of running time if the continuous subtraction mode has been selected. Furthermore, at the precise moment of arrival of the participant, an automatic switching means (not illustrated) stops the display exactly at the official time of the competitor. This is made possible by virtue of the fact that the system replaces instantaneously, as the input of the subtractor 44, the output of counter 32 by the output of register 36 at the arrival of a participant.

The selector 52 permits the operator to observe different informations upon the miniature display 53. He may select the output of register 36, that being the time of the last event. He may also check a specific stored data or get the output of subtractor 44 for purposes of reading the actual time of the participant. This time may be the time of a competitor who has already completed the race, or the running time of another competitor still in the race.

Independently of this system, but starting from the same time base, another counter 60 is coupled to an auxiliary display 62 thereby to provide a reading of the time being recorded for the successive events. Counter 60 also feeds the time to printer 64 to record the precise time of every event occurring during the competition, without distinction. This means makes it possible to retrieve the data pertaining to each competitor and to calculate the race time manually. Furthermore, at the end of the race, the starting and finish times of all the competitors having been stored into the memories, the race time of each competitor may be verified. This optional accessory proves very useful for the rapid compilation of the results and for tracing errors.

Figure 3:
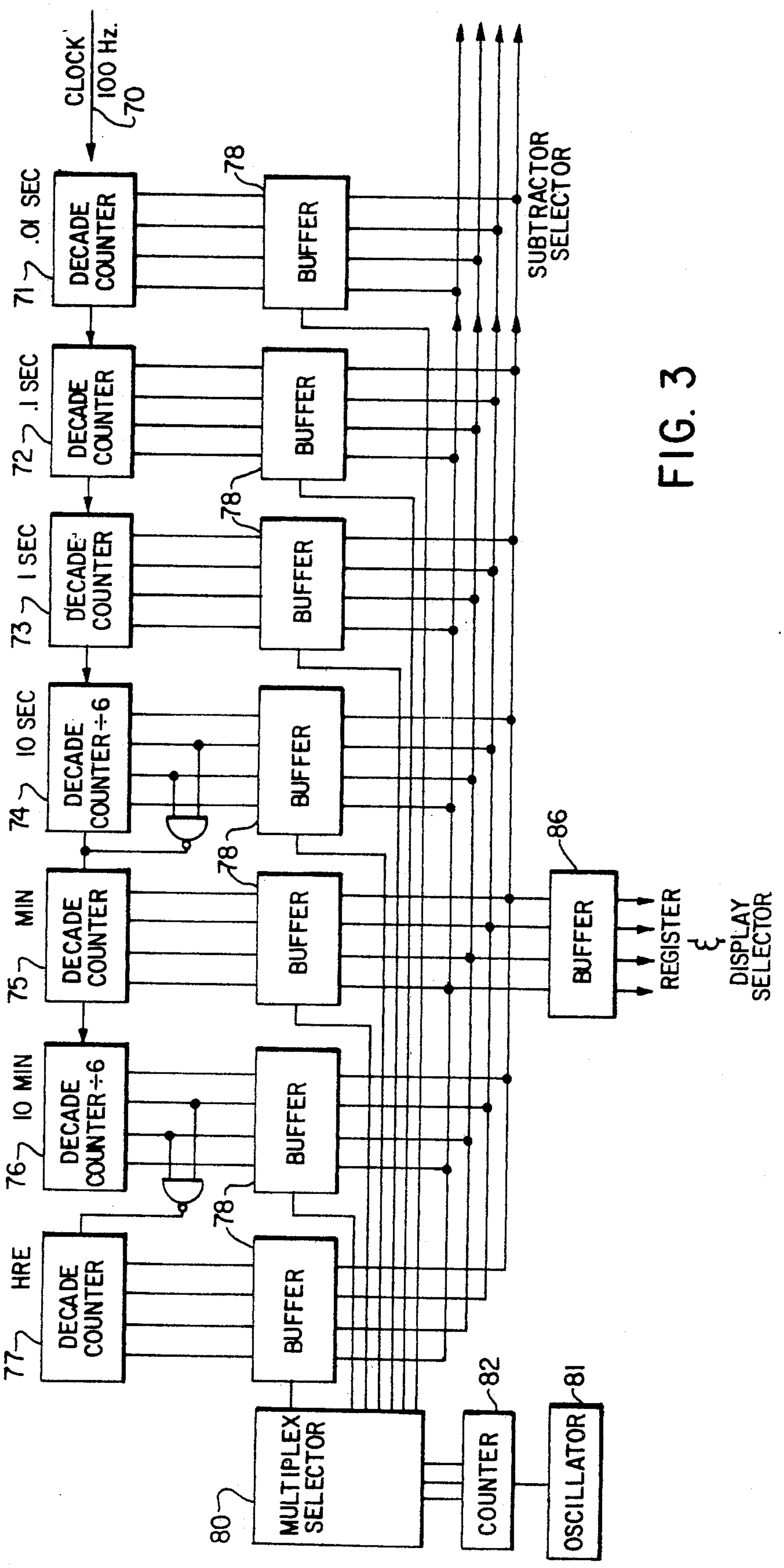
FIG. 3 is a block-diagram of a clock as used in the timing apparatus of FIG. 2.

The circuit of the group oscillator, decade counters 30, 32 appears in FIG. 3. The clock signal 70 is a square wave at a frequency of 100 Hz; it is divided by 10 by each of decade counters 71, 72, 73, 75, and 77 and by 6 by counters 74 and 76. An isolating buffer 78 providing 3 state outputs is associated with each decade counter 71 to 77 for the purpose of multiplexing the output data, thus reducing the number of circuits required in the subsequent parts of the system. A multiplex selector 80, a counter 82 and an oscillator 81 are associated with buffers 78 for scanning same. Buffer 86 isolates register 36 from the output of buffers 78, and as shown in FIG. 4, further buffers 90, 92 are associated with memories 40, 42 when recording data.

Register 36 is used for storing the times of the eight last starts and/or finishes. It may be, for example, of the last-in, first-out type. Its principal function is to serve as a temporary memory for the times of events (starting or finish), before their entry in one of the principal memories 40, 42. It permits the quasisimultaneous arrival of several occurrences. Register 36 as well as buffer 86 are activitated only upon the occurrence of a start or of a finish. A mechanical switch 94 associated with counter 96 is used to command register data retrieval.

Memories 40, 42 are used as permanent memories for the recording of the respective finish and starting times. The numerical switches 98 and their decoder 99 are used to code every participant in the memories 40, 42.

Buffer memory 100 is used as a fixed source of the "start" time for the subtraction function.

Figure 5:
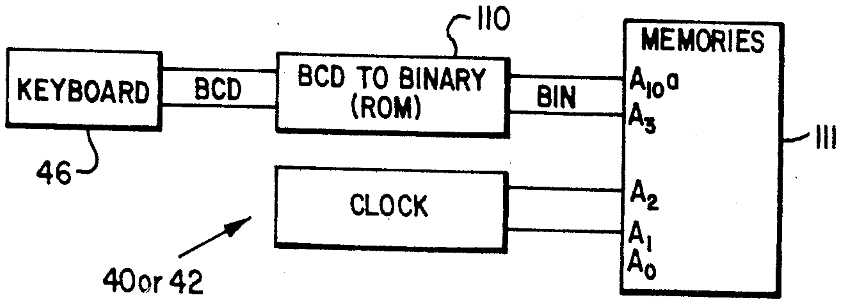
FIG. 5 located on the same sheet as FIG. 1, is a block-diagram of the data input means associated with each principal memory.

The structure of each of the two memories 40, 42 (which are similar) is illustrated in FIG. 5. It has two blocks of 2K×4 bits (2048 words of 4 bits). Seven words of 4 bits provide the desired information and are arranged sequentially at successive addresses. As each of these blocks is located in eight word spaces, one word of four bits remains available for increasing the number of decades from 7 to 8 if desired.

FIG. 5 presents the address mode in use. A BCD to binary encoder (Read Only Memory) 110 of 1024×8 bits converts the BCD code of keyboard 46 into binary code for the address of memories 111. This permits access to the corresponding blocks of the desired number. The individual words are thereafter successively addressed by the synchronous clock.

Figure 6:
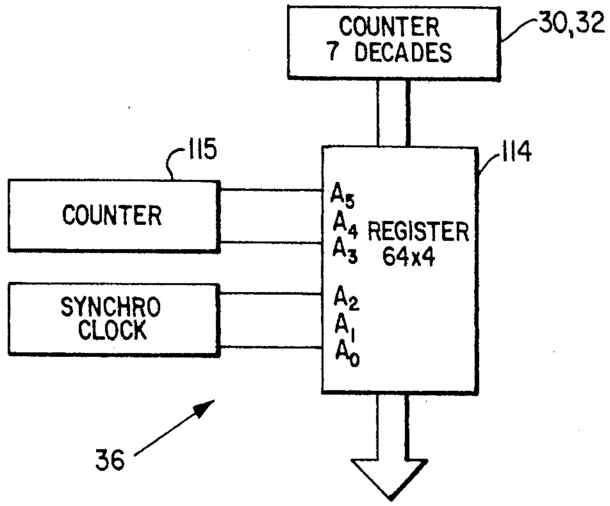
FIG. 6 is a block-diagram illustrating the data input means associated with the register used in the timing apparatus of FIG. 2.

With regard to register 36, illustrated in FIG. 6, in order to simulate an 8 level register, a memory 114 of 64 words×4 bits is used. With an 8×8 word×4 bits structure, it is addressed in the same manner as the other memory 111. Keyboard 46 for entry of the participants' numbers is replaced, in this case, by counter 115 which permits keeping in memory the eight lasts numbers; this is done by constantly counting from 0 to 7.

Figure 7:
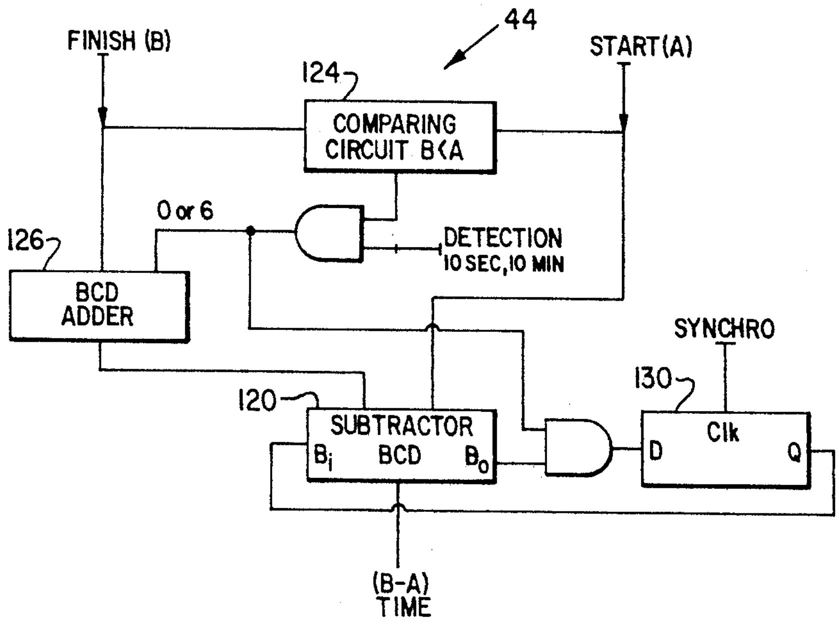
FIG. 7 is a diagram of the substraction circuits which may be used as a substraction unit in the timing apparatus.

An important element of the above described apparatus is subtractor 44 illustrated in FIG. 7. It must function in hours, minutes, seconds and decimal fractions of a second. Furthermore, it must be able to perform static subtraction (as in the case of a simple difference) as well as continual subtractions.

The data is presented from the least important number to the most important one. Thus BCD subtractor 120 and flip flop 130 perform successive subtractions. In effect, if borrowing is necessary during the substraction of a decade, flip flop 130 retains the status of the borrowing in order to be considered in the following decade.

If the unit is to substract a word limited to 5 (tens of seconds or of minutes), it is necessary to first determine whether borrowing is necessary. Comparing circuit 124 determines in each case whether it is necessary to borrow from the following decade. In the affirmative, a number of six (6) is added to the decade by means of BCD adder 126. Furthermore, the state of the following bit is modified. If borrowing is not necessary, subtraction proceeds normally.

The difference therefore appears at the output while the values follow one another in succession at the input. The frequency of the synchronous clock 130 is 200 kHz, thus a complete subtraction lasts approximately 40 microseconds (0.04 miliseconds).

As described above, this chronometer may be produced from interconnected logic circuits where the words of 4 bits (BCD) are processed in series and where the bits composing the words are processed in parallel. This system may advantageously be obtained in software with the assistance of a microprocessor.

What we claim and desire to secure by Letters Patent is:

1. A numerical timing apparatus for sporting events such as marathons and the like races involving a large number of participants progressing on the same track between a starting gate and a finish line but not necessarily crossing the starting gate simultaneously, comprising:

a. signal means to produce an electrical signal which coincides in time with the lowering of the starting gate for one or more participants or the crossing of the finish line by any participant;

b. a multiple level register intended for the temporary registration of all starting times and of all finish times, including those happening in close succession;

c. an oscillator and decade counters group for producing a clock signal throughout said competition, said clock signal incorporating time information and being adapted to be applied to said register in response to said electrical signal;

d. starting time memory means coupled to the output of said register and used to store every starting time registered;

e. finish time memory means coupled to the output of the said register for storing every finish time registered in said register;

f. manual keying address means associated with said starting time and finish time memory means and operated throughout said sporting event for keying in the participant's identification codes whose recorded times are being retrieved from said register and stored in one of said memory means;

g. means for the subtraction of digital values intended for selectively subtracting for any one of said participants the starting time stored in said starting memory means from the current clock signal, or alternatively, from the participant's registered or stored finish time; and h. means for decoding and displaying the data furnished by said subtraction means thereby giving a visual indication of the track time of any one of the participants during the competition, and the final time when that participant crosses the finish line.

2. Apparatus as defined in claim 1 comprising manual control means, usable each time an identification code has been keyed in, for triggering the retrieval from said register, and for the transferring to said memory means of a recorded time and for selecting which of the two memory means is to receive and store the information so transferred.

3. Apparatus as defined in claim 2 comprising means for automatically switching input to said subtraction means in response to said signal means when a participant whose elapsing time is being calculated by said subtraction means crosses said finish line.

4. Apparatus as defined in claim 3 wherein said manual keying address means and other controls are in a control panel within the reach of the operator of the apparatus, said apparatus further comprising, on said control panel, a miniature display providing a visual indication of the information displayed by the said decoding and display means.

5. Apparatus as defined in claim 4 comprising a selector on said control panel for permitting the display on the said miniature display means of any of the data registered, stored or generated by the said apparatus, as the operator wishes.

6. Apparatus as defined in claim 5 wherein said control panel comprises a manual retreive control permitting the operator to store in the said memory means the finish and starting times accumulated in said register following a limited number of electrical signals happening in close succession.

7. Apparatus as defined in claim 6 wherein oscillator and decade counters group consists of an oscillator producing an electrical clock signal at a frequency of 100 Hz, a series of seven decade counters furnishing the time in hours, tens of minutes, units of minutes, tens of seconds, units of seconds, tens of seconds and hundredths of seconds respectively, a three state buffer for each decade counter, a multiplex selector associated with said three state buffers for multiplexing the data supplied by said decade counters, and an isolating buffer in circuit between said three state buffers and said register for isolating the latter except upon receipt of one of said electrical signals.

8. A timing apparatus for sporting events such as marathons and the like races involving a large number of participants whose starting times may differ, each participant having and carrying in a detectable fashion a different identification code, said timing apparatus comprising:

a. a source of clock signal representing the time;

b. register means coupled with said source of clock signal for temporarily storing the time of every successive start and finish event, said register means having a multilevel capacity for temporarily storing the times of a plurality of rapidly succeeding start and finish events up to a predetermined number thereof and allowing subsequent retrieval of said last mentioned times;

c. memory means for storing the identification code, the start time and the finish time of every participant;

d. address keying means for feeding to said memory means the identification code of the participant associated with the start or finish event whose time the operator wishes to transfer from said register means into said memory means;

e. manual control means operable after each identification code entry for transferring from said register means into said memory means the corresponding start time or finish time as the case may be;

f. subtractor means coupled with said memory means for the subtraction of the start time of any selected participant as recorded in said memory means from any subsequent time;

and g. output means for indicating the result of said subtraction;

9. Apparatus as defined in claim 8 wherein said output means comprises a visual display.

10. Apparatus as defined in claim 8 comprising signal means for signalling the starting times by producing an electrical signal which coincides in time with a lowering of the starting gate, and for signalling the finish times by producing an electrical signal which coincides in time with crossing of the finish line, and circuit means interconnecting said signal means and said register means.

11. Apparatus as defined in claim 9 wherein the input of said substractor is said source of clock signal until registration in said register means of the arrival time of the participant chosen by the operator.

12. Apparatus as defined in claim 9 wherein said source of clock signal comprises an oscillator, a series of decade counters of which the first is coupled to the output of said oscillator, a three state buffer at the output of each decade counter and a multiplex selector interconnected in parallel to said three state buffers for multiplexing their outputs and thus produce said clock signal in units of hours, tens of minutes, units of minutes, tens of seconds, units of seconds, and if necessary in tenths and even hundredths of a second.

13. Apparatus as defined in claim 12 wherein said oscillator generates a square wave of a frequency of 100 Hz, and wherein said decade counters related to the tens of seconds and the tens of minutes divide by six whereas the other ones of said decade counters divide by ten.

14. Apparatus as defined in claim 9 wherein said register means is a multi-level register of the type last in, first out.

15. Apparatus as defined in claim 9 wherein said memory means is comprised of two sections, one intended for storing the starting times of the participants, and the other the finish times, and wherein said manual control means selects which section of said memory means receives the retreived data.

16. Apparatus as defined in claim 11 comprising automatic switching means acting simultaneously upon the crossing of the finish line by any participant whose elapsing time was being continuously calculated by said subtractor, said switching means substituting the participant's finish time as stored in said register means for said source of clock signal as the input of said subcontractor means.

17. A method of timing a sporting event such as marathons and the like races involving a large number of participants whose starting times may differ, each participant having and carrying in a visible fashion a different identification code, comprising the step of using a timing apparatus having a source of clock signal, a multi-level register means, a memory of sufficient capacity, address keying means for entry of said identification codes, a manual control for transferring time date from said register means to an appropriate place in said memory, a subtractor for subtracting a first time value from a recorded time value and output means for indicating the time difference calculated by said subtractor, and the steps of:

a. prerecording in said memory the names and the identification codes of each and all participants;

b. using said source of clock signal for temporarily storing in said multi-level register means the times of the successive start and finish events in the order of their occurrence;

c. retrieving from said register means and, while the race is in progress, transferring to said memory said last mentioned times by successively keying into said timing apparatus by means of said address keying means the identification code of the participant associated with the start or finish event whose time the operator wishes to place into said memory and actuating said manual control for triggering said retrieval and transfer from said register means to said memory;

d. repeating the same procedure for every other start or finish event whose time was stored in said register means but had not yet been retrieved therefrom, until depletion of all useful times stored in said register means;

e. keying into said timing apparatus by means of said address keying means the identification code of the next participant about to cross the finish line;

f. applying to said subtractor as said second time value the source of clock pulses and as said first time value the start time of said last mentioned participant, which start time was stored in said memory, maintaining this condition until said last mentioned participant crosses said finish line;

g. when said last mentioned participant crosses said finish line, applying to said substractor, as said second time value, the finish time being stored in said register means;

h. shortly, after said last mentioned crossing, actuating said manual control for retrieving from said register means and transferring to said memory said last mentioned finish time;

i. repeating steps (e) to (h) for every successive finish event;

j. repeating steps (c) and (d) at the first opportunity whenever successive events take place too rapidly for steps (e) to (h) to be performed on a continuing basis; and k. throughout the sporting event, indicating said time difference by means of said output means.

* * * * *

UNITED STATES PATENT AND TRADEMARK OFFICE
CERTIFICATE OF CORRECTION

PATENT NO. : 4,451,896

DATED : May 29, 1984

INVENTOR(S) : Andre Pomerleau; Jean-Francoys Brousseau

It is certified that error appears in the above-identified patent and that said Letters Patent is hereby corrected as shown below:

On the title page

Please delete "[73] Assignee: Universite Laval, Ste-Foy, Canada" and substitute therefor --[73] Assignee: Centre De Recherche Industrielle Du Quebec--.

Signed and Sealed this

Twentieth Day of November 1984

[SEAL]

Attest:

GERALD J. MOSSINGHOFF

Attesting Officer

Commissioner of Patents and Trademarks